No. 802,467. PATENTED OCT. 24, 1905.
R. H. McNAIR.
MANURE SPREADER.
APPLICATION FILED JAN. 14, 1903.

3 SHEETS—SHEET 2.

Witnesses: Inventor:
Reuben H. McNair
by Jones & Addington
attorneys

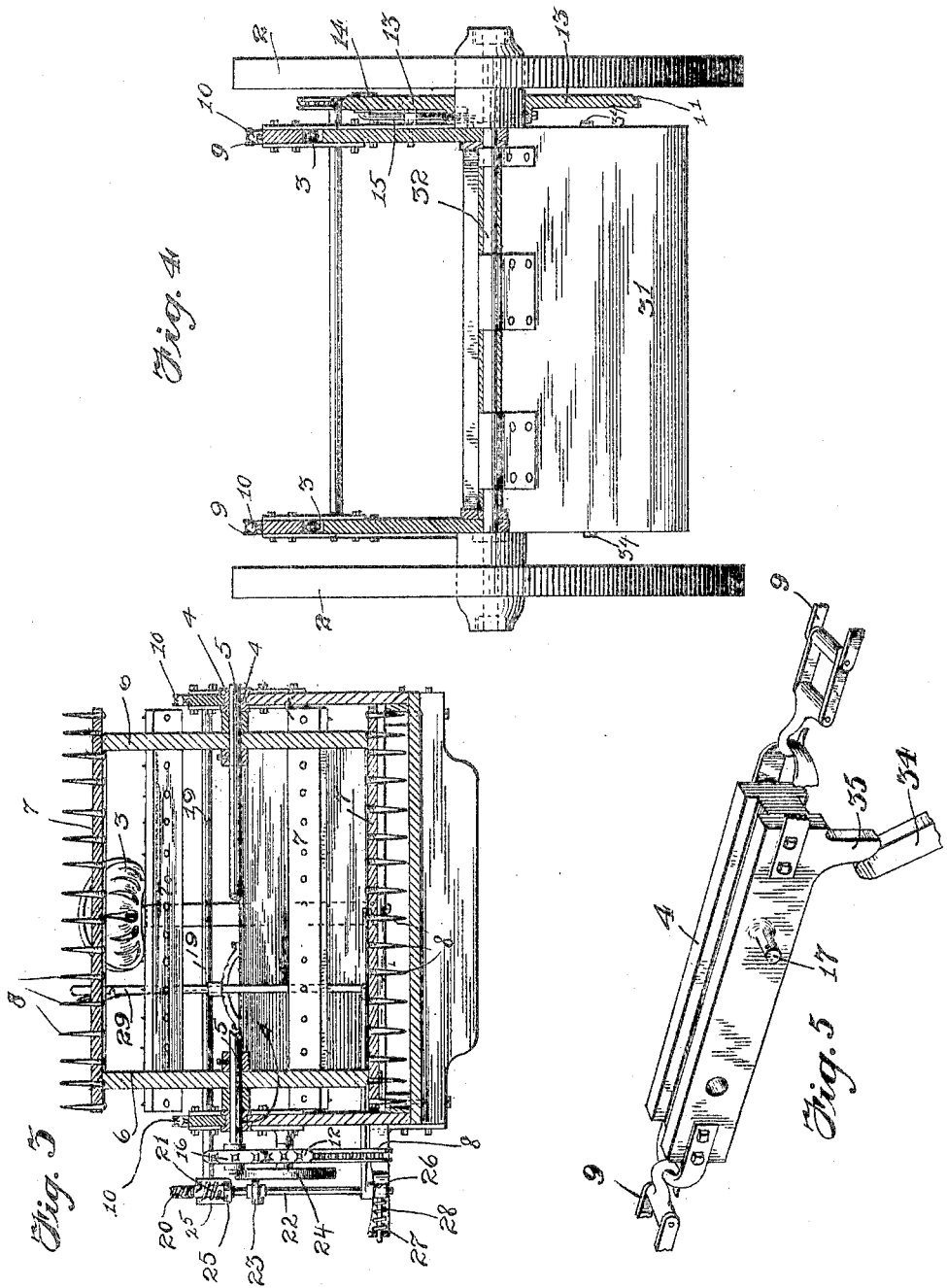

UNITED STATES PATENT OFFICE.

REUBEN H. McNAIR, OF ELBURN, ILLINOIS, ASSIGNOR TO FREDERICK B. MOORE, OF PLANO, ILLINOIS.

MANURE-SPREADER.

No. 802,467.      Specification of Letters Patent.      Patented Oct. 24, 1905.

Application filed January 14, 1903. Serial No. 138,988.

*To all whom it may concern:*

Be it known that I, REUBEN H. MCNAIR, a citizen of the United States, residing at Elburn, in the county of Kane and State of Illinois, have invented a certain new and useful Improvement in Manure-Spreaders, of which the following is a full, clear, concise, and exact description, reference being had to the accompanying drawings, forming a part of this specification.

The present invention relates to improvements in fertilizer-distributers, it being the object thereof to provide a machine which will automatically distribute the fertilizer.

According to the preferred form of the present invention, the means which distributes the fertilizer is advanced toward the bulk of the fertilizer, and the bulk of the fertilizer is placed in a receptacle having a sectional bottom. The sections of said bottom are opened as the fertilizer is removed therefrom, thereby preventing the bottom of the receptacle from interferring with the distribution of the fertilizer.

Figure 1:
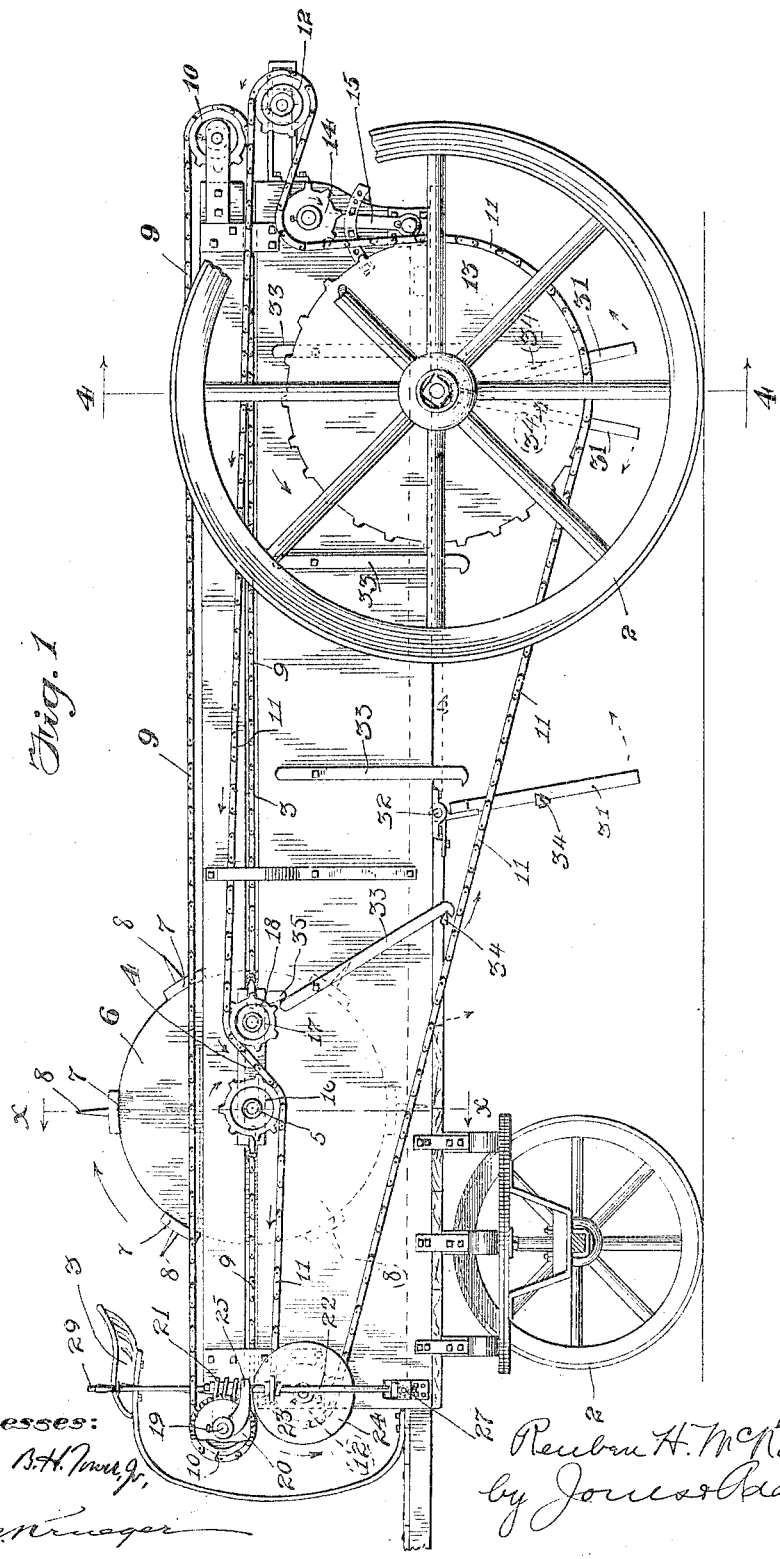
Figure 2:
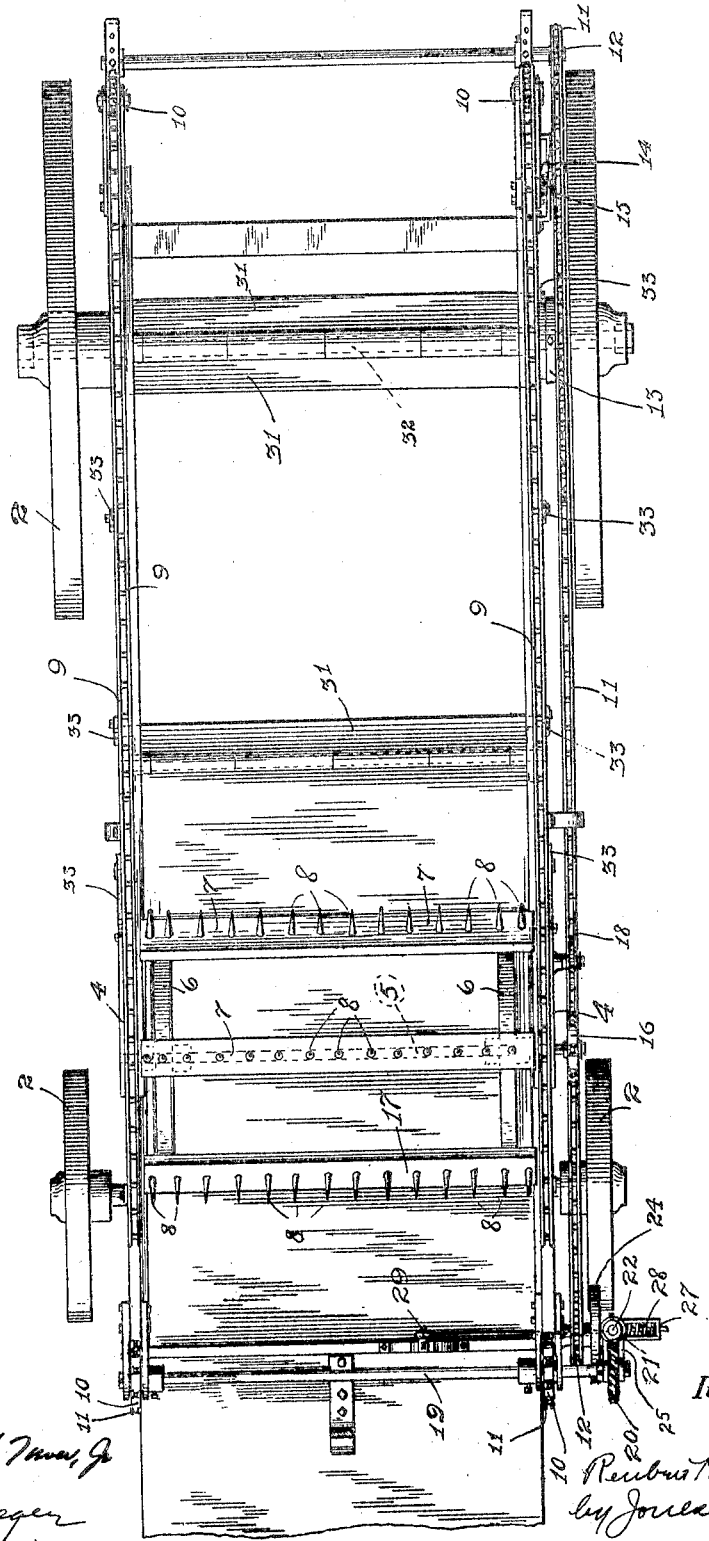

The present invention shall be explained by the machine which is illustrated in the accompanying drawings, the views in said drawings being as follows:

Figure 1 is a side elevation of the machine. Fig. 2 is a plan view thereof. Fig. 3 is a cross-sectional view on the line $x$ $x$ of Fig. 1. Fig. 4 is a cross-sectional view on the line 4 4 of Fig. 1, showing one of the sections of the bottom open; and Fig. 5 is a perspective view of one of the bearings for the distributing device.

The box or receptacle 1, which contains the fertilizer, is mounted upon wheels 2. The sides of said box are each provided with a slot 3, in which is slidably mounted a bearing-box 4. The bearing-boxes have journaled therein a shaft 5, which carries circular heads or frames 6. The heads 6 carry bars or rods 7, from which project pins 9. The rods 7 are arranged cylindrically to form a drum from which project said pins, said drum being rotatable upon the shaft 5. The pins 8 are so disposed longitudinally that a spiral line of pins extends around the periphery of the drum. The bearing-boxes 4 are connected to chains 9, which are carried by sprocket-wheels 10, said sprocket-wheels being journaled upon suitable bearings.

The driving-chain 11 passes over sprocket-wheels 12, one of said sprocket-wheels being arranged at each end of the machine, and said chain is driven by a sprocket-wheel 13, which is fastened to one of the rear wheels 2. The tension of the driving-chain may be adjusted by an idler 14, which is mounted upon a pivoted arm 15. The shaft 5 is provided with a sprocket-wheel 16, which meshes with the driving-chain. One of the bearing-boxes 4 is provided with a stud 17, upon which is journaled a sprocket-wheel 18, said sprocket-wheel being in engagement with the driving-chain to retain said chain firmly in engagement with the sprocket-wheel 16.

The sprocket-wheels 10 at forward end of the machine are mounted upon a shaft 19, said shaft being provided with a worm-gear 20, which is engaged by a worm or screw 21, mounted upon a shaft 22. The shaft 22 carries a roller 23, which engages a disk 24, said disk being connected to one of the sprocket-wheels 12, which is arranged at forward end of the machine. The position of the roller 23 may be adjusted along the shaft 22, thereby permitting said roller to be placed at different distances from the center of the disk or to engage said disk upon either side of its center.

The bearing-bracket 25, which is mounted upon the shaft 19, has the upper end of the shaft 22 journaled therein, thereby keeping the screw 21 in engagement with the worm-gear 20. The lower end of the shaft 22 is journaled in a slidable bearing-box 26, which is mounted upon a bracket 27. The bearing-box 26 is pressed inwardly by a spring 28 to normally keep the roller 23 in engagement with the disk 24, and said bearing-box is connected to a lever 29, by which it may be moved outwardly to remove the roller 23 from engagement with the disk 24.

The bottom of the box or receptacle 1 is preferably composed of a series of shelves or sections 31, which are hinged or pivoted upon bars 32. The sections are preferably arranged in pairs, the sections of each pair being hinged to the same bar to minimize the number of bars extending across the bottom of the receptacle. The sections are preferably retained in a horizontal position by levers or latches 33, which are pivoted upon the receptacle 1. The sections are each provided upon each side thereof with a lug or projection 34, which is engaged by one of the levers 33. The bearing-boxes 4 are each provided with a lug or projection 35, which is adapted to engage the levers 33, arranged upon the same side of the receptacle as said bearing-box.

The driving-chain 11 is driven by the sprocket-wheel 13 while the machine is in motion. The sprocket-wheel 16 is driven by the driving-chain, thereby rotating the axle 5 to revolve the distributing-drum. The driving-chain also drives the sprocket-wheel 12 at the forward end of the machine, thereby revolving the disk 24, which drives the roller 23 to rotate the worm 21. The worm-gear 20 is driven by said worm, thereby driving the sprocket-wheel 10 at the forward end of the machine to run the chains 9. The bearing-boxes are drawn by said chain, thereby moving said drum.

When the machine is placed in condition for operation, the receptacle is filled with the fertilizing material, the sections of the bottom of the receptacle being closed and the drum being arranged at the rear of the receptacle. As the machine moves over the ground where the fertilizer is to be distributed the drum revolves, thereby causing the pins to engage the fertilizer and throw it over the drum to the ground, the drum being advanced toward the bulk of the fertilizer. During the forward movement of the drum the projections 35, carried by the bearing-boxes, engage the levers 33, thereby causing the sections of the bottom to be released after the fertilizer has been removed therefrom to permit the sections of the bottom to fall or open, so that the bottom of the receptacle will not interfere with the distribution of the fertilizer. The rate at which the drum advances toward the bulk of the fertilizer may be regulated by moving the roller 23 toward or away from the center of the disk 24. The distribution of the fertilizer may be stopped by operating the lever 29 to remove the roller 23 from engagement with disk 24. When the distributing-drum has reached the forward limit of its movement, the roller 23 may be moved to the opposite side of the center of the disk 24 to cause the distributing-drum to be returned to the rear of the receptacle.

It is obvious that many changes may be made in the construction of the machine which has been set forth herein for the purpose of disclosing the invention, said changes being within the purview of the claims which are appended hereto.

Having thus described my invention, what I claim as new, and desire to secure by Letters Patent, is—

1. In a fertilizer-distributer, the combination with a receptacle for the fertilizer, said receptacle being provided with a bottom made in sections, a distributer movable toward the bulk of the fertilizer to distribute the same, means for advancing said distributer independently of said receptacle, means for operating said distributer to distribute said fertilizer, and means for causing the sections of the bottom of said receptacle to be opened after the fertilizer has been removed therefrom.

2. In a fertilizer-distributer, the combination with a receptacle for the fertilizer, said receptacle being provided with a bottom made in sections, a distributer movable toward the bulk of the fertilizer to distribute the same, means for advancing said distributer independently of said receptacle, means for operating said distributer to distribute the fertilizer, means for controlling the operations of said distributer, and means for causing sections of the bottom of said receptacle to be opened after the fertilizer has been removed therefrom.

3. In a fertilizer-distributer, the combination with a receptacle for the fertilizer, said receptacle being provided with a bottom made in sections, means movable toward the bulk of the fertilizer to distribute the same, and means for causing the sections of said bottom to be opened after the fertilizer supported thereby has been distributed.

4. In a fertilizer-distributer, the combination with a receptacle for the fertilizer, of means movable toward the bulk of the fertilizer to distribute the same, a bottom for said receptacle composed of pivoted sections, said sections being closed to support the fertilizer, and means for causing said sections to open after the fertilizer supported thereby has been distributed.

5. In a fertilizer-distributer, the combination with a receptacle for the fertilizer, of means for distributing the fertilizer, said means being movable toward the bulk of the fertilizer, a bottom for said receptacle composed of sections, said sections being arranged in pairs and the sections of each pair being hinged or pivoted upon the same pivot, and means for causing said sections to be opened after the fertilizer supported thereby has been distributed.

6. In a fertilizer-distributer, the combination with a receptacle for the fertilizer, of a rotary drum movable toward the bulk of the fertilizer to distribute the same, a bottom for said receptacle consisting of a series of sections, and means for causing said sections to be opened successively as the fertilizer supported thereby is distributed.

7. In a fertilizer-distributer, the combination with a receptacle for the fertilizer, of a rotary drum for distributing the fertilizer, said drum being movable toward the bulk of the fertilizer, a bottom for said receptacle composed of a series of sections, a series of catches or latches for supporting said sections in a horizontal position, and means for operating said latches as said drum advances to release said sections successively, thereby causing said sections to be opened successively as the fertilizer supported therein is distributed.

8. In a fertilizer-distributer, the combination with a receptacle for the fertilizer, of a rotatable drum for distributing the fertilizer, said drum being movable toward the bulk of the fertilizer, means for advancing said drum independently of said receptacle, means for rotating said drum, means arranged at the bottom of said receptacle and supporting said fertilizer, said means being operated as said drum advances to open said bottom, thereby preventing said bottom from interfering with the distribution of the fertilizer.

9. In a fertilizer-distributer, in combination, a receptacle for the fertilizer, a distributer adapted to be advanced toward the bulk of the fertilizer, means for advancing said distributer independently of said receptacle, means for operating said distributer to distribute the fertilizer, and means for changing the rate of movement of said distributer toward the bulk of the fertilizer.

10. In a fertilizer-distributer, in combination, a receptacle for the fertilizer, a distributer adapted to be advanced toward the bulk of the fertilizer to distribute the same, means for advancing said distributer independently of said receptacle, means for operating said distributer to distribute the fertilizer, and means for changing the direction of motion of said distributer along said receptacle.

11. A fertilizer-distributer, in combination, a receptacle for the fertilizer, a distributer movable toward the bulk of the fertilizer to distribute the same, means for operating said distributer, and means for changing the rate of motion of said distributer toward the bulk of the fertilizer, and means for reversing the direction of motion of said distributer along said receptacle.

12. In an apparatus of the class described, a receiver for the material to be distributed, and having the floor formed of a plurality of consecutively-removable floor-sections, and a distributer means mounted for movement toward the material upon said floor for consecutively removing the floor-sections and removing the material therefrom simultaneously.

13. In an apparatus of the class described, in combination, a receptacle having an openable bottom; and a traveling distributer movable through the receptacle.

14. In an apparatus of the class described, in combination, a receptacle having an openable bottom; ways extending longitudinally of the receptacle; and a distributer carried in boxes movable in said ways.

15. In an apparatus of the class described, in combination, a receptacle; and a traveling distributer movable through the receptacle independently of the bottom thereof.

16. In an apparatus of the class described, in combination, a receptacle having a traction-wheel and a sectional openable bottom; and means actuated by the traction-wheel and acting successively on the bottom sections to open them.

17. In an apparatus of the class described, in combination, a receptacle having a sectional openable bottom; and means acting successively on the bottom sections for opening them.

18. In an apparatus of the class described, in combination, a receptacle having a sectional openable bottom; a traveler successively engaging the bottom sections to open them; a traction-wheel; and operative connection between the traveler and the wheel.

19. In an apparatus of the class described, in combination, a receptacle, a distributer having a movement through the body of the receptacle; means for moving the distributer and for opening the floor of the receptacle as the distributer advances.

In witness whereof I have hereunto subscribed my name in the presence of two witnesses.

REUBEN H. McNAIR.

Witnesses:
C. E. MORRILL,
W. S. MORRILL.